(12) United States Patent
Armstrong et al.

(10) Patent No.: US 10,558,523 B2
(45) Date of Patent: Feb. 11, 2020

(54) COMPUTING SYSTEM WITH DATA PROTECTION ENHANCEMENT MECHANISM AND METHOD OF OPERATION THEREOF

(71) Applicant: CNEXLABS, Inc., San Jose, CA (US)

(72) Inventors: Alan Armstrong, Los Altos, CA (US); Yiren Ronnie Huang, San Jose, CA (US); Xiaojie Zhang, Saratoga, CA (US)

(73) Assignee: CNEX LABS, Inc., San Jose, CA (US)

( * ) Notice: Subject to any disclaimer, the term of this patent is extended or adjusted under 35 U.S.C. 154(b) by 0 days.

(21) Appl. No.: 15/169,279

(22) Filed: May 31, 2016

(65) Prior Publication Data
US 2017/0344426 A1     Nov. 30, 2017

(51) Int. Cl.
*G06F 11/10*     (2006.01)
*G11B 20/18*     (2006.01)

(52) U.S. Cl.
CPC ...... *G06F 11/1076* (2013.01); *G11B 20/1833* (2013.01)

(58) Field of Classification Search
CPC .. G06F 11/1076; G06F 3/0683; G06F 3/0619; G06F 3/064; G11B 20/1833
See application file for complete search history.

(56) References Cited

U.S. PATENT DOCUMENTS

| | | | |
|---|---|---|---|
| 2010/0174954 A1* | 7/2010 | Karabed | G11B 20/1833 714/704 |
| 2015/0309860 A1 | 10/2015 | Fischer et al. | |
| 2015/0331741 A1 | 11/2015 | Park et al. | |
| 2015/0347230 A1 | 12/2015 | Anholt et al. | |
| 2015/0363262 A1 | 12/2015 | Hu et al. | |
| 2016/0055882 A1 | 2/2016 | Cideciyan et al. | |
| 2017/0264312 A1* | 9/2017 | Varanasi | G11C 11/5621 |

* cited by examiner

*Primary Examiner* — April Y Blair
*Assistant Examiner* — Rong Tang
(74) *Attorney, Agent, or Firm* — Perspectives Law Group, Corp.

(57) ABSTRACT

A computing system includes: storage devices configured to read data sectors; and a data correction engine, coupled to the storage devices, configured to: detect an error data sector among the data sectors, generate soft information from the error data sector, apply a soft bit flipping logic to the error data sector to produce a transformed data sector, and generate a corrected data sector from the transformed data sector.

30 Claims, 6 Drawing Sheets

US 10,558,523 B2

COMPUTING SYSTEM WITH DATA PROTECTION ENHANCEMENT MECHANISM AND METHOD OF OPERATION THEREOF

TECHNICAL FIELD

An embodiment of the present invention relates generally to a computing system, and more particularly to a system for data protection.

BACKGROUND

Modern consumer and industrial electronics, especially devices such as graphical computing systems, televisions, projectors, cellular phones, portable digital assistants, and combination devices, are processing massive amounts of data. Storing and retrieving large data files can present problems as storage media wears and data becomes corrupted. As data storage transitions from magnetic media to semiconductor non-volatile memory, the data protection processes can be lengthy and consume additional capacity in order to preserve the stored data.

Thus, a need still remains for a computing system with data protection enhancement mechanism to provide improved data reliability and recovery. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including storage devices configured to read data sectors; and a data correction engine, coupled to the storage devices, configured to: detect an error data sector among the data sectors, generate soft information from the error data sector, apply a soft bit flipping logic to the error data sector to produce a transformed data sector, and generate a corrected data sector from the transformed data sector.

An embodiment of the present invention provides a method including reading data sectors; detecting an error data sector among the data sectors; generating soft information from the error data sector; producing a transformed data sector from the error data sector based on the soft information for altering a low confidence bit; and generating a corrected data sector from the transformed data sector.

An embodiment of the present invention provides a non-transitory computer readable medium including: reading data sectors; detecting an error data sector among the data sectors; generating soft information from the error data sector; producing a transformed data sector from the error data sector based on the soft information for altering a low confidence bit; and generating a corrected data sector from the transformed data sector.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
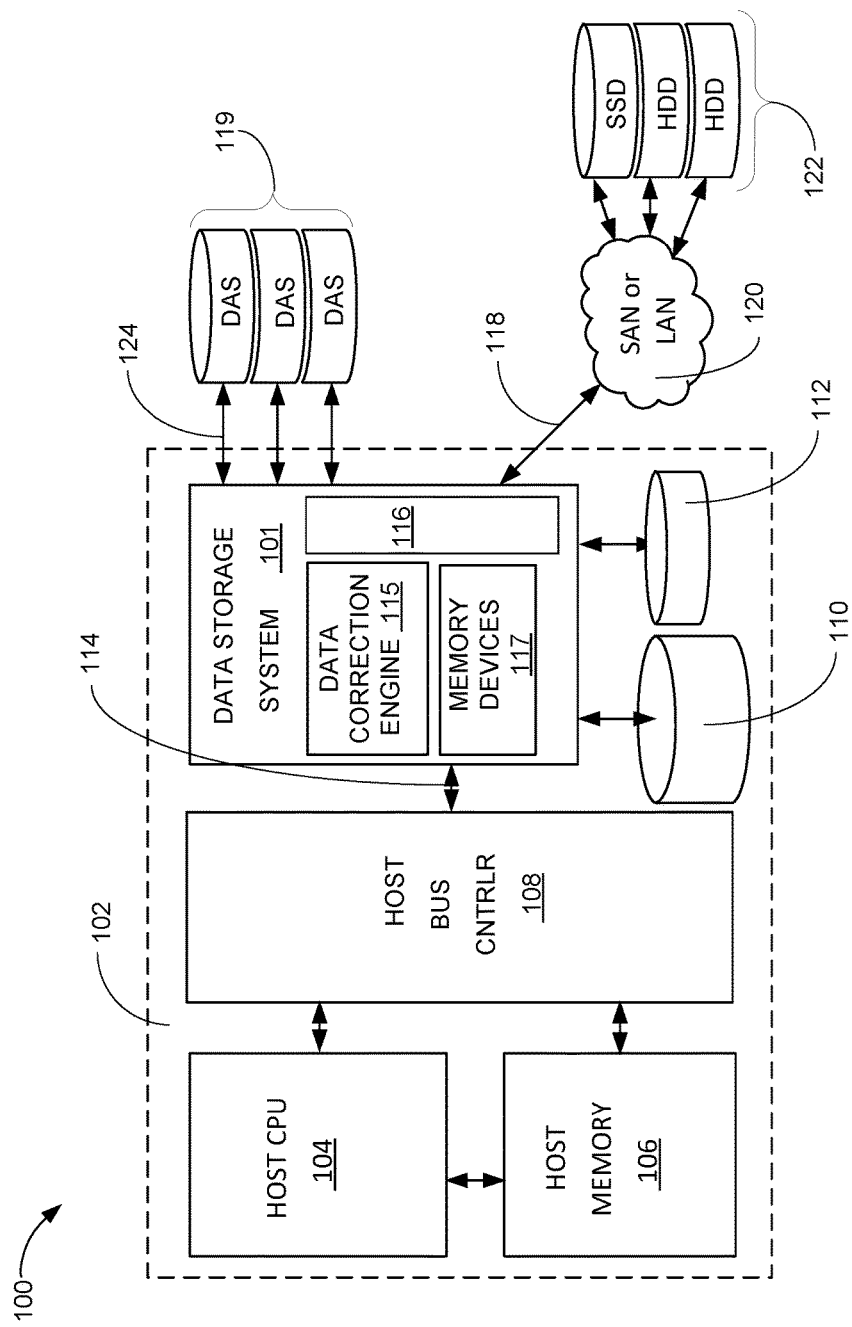
FIG. 1 is a computing system with data protection enhancement mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with data protection enhancement mechanism in an embodiment of the present invention protection enhancement mechanism with a data storage system 101 in an embodiment of the present invention. The functional block diagram depicts the data storage system 101, installed in a host computer 102, such as a server or workstation including at least a host central processing unit 104, host memory 106 coupled to the host central processing unit 104, and a host bus controller 108. The host bus controller 108 provides a host interface bus 114, which allows the host computer 102 to utilize the data storage system 101.

It is understood that the function of the host bus controller 108 can be provided by host central processing unit 104 in some implementations. The host central processing unit 104 can be implemented in a number of different manners. For example, the host central processing unit 104 can be a processor, an application specific integrated circuit (ASIC) an embedded processor, a microprocessor, a hardware control logic, a hardware finite state machine (FSM), a digital signal processor (DSP), or a combination thereof.

The data storage system 101 can be coupled to a local storage device 110, such as a non-volatile memory based storage device having a peripheral interface system, or a non-volatile memory 112, such as an internal memory card for expanded or extended non-volatile system memory.

The data storage system 101 can also be coupled to direct attach storage devices 119, such as hard disk drives (HDD), solid state storage devices (SSD), or hybrid disk drives, that can be mounted in the host computer 102, external to the host computer 102, or a combination thereof. The local storage device 110, the non-volatile memory 112, and the direct attach storage devices 119 can be considered as direct attached storage (DAS) devices, as an example.

The data storage system 101 can also support a network attach port 118 for coupling a network 120. Examples of the network 120 can be a local area network (LAN) and a storage area network (SAN). The network attach port 118 can provide access to network attached storage (NAS) devices 122.

While the network attached storage devices 122 are shown as hard disk drives, this is an example only. It is understood that the network attached storage devices 122 could include magnetic tape storage (not shown), and storage devices similar to the local storage device 110, the non-volatile memory 112, or the direct attach storage devices 119 that are accessed through the network attach port 118. Also, the network attached storage devices 122 can include just a bunch of disks (JBOD) systems or redundant array of intelligent disks (RAID) systems as well as other network attached storage devices 122.

The data storage system 101 can be attached to the host interface bus 114 for providing access to and interfacing to multiple of the direct attached storage (DAS) devices 119 via a cable 124 for storage interface, such as Serial Advanced Technology Attachment (SATA), the Serial Attached SCSI (SAS), or the Personal Computer Interface-Express (PCI-e) attached storage devices.

The data storage system 101 can include a data correction engine 115 coupled to a storage controller 116 and memory devices 117. The data correction engine 115 can control the flow and management of data to and from the host computer 102, and to and from the direct attached storage (DAS) devices 119, the network attached storage devices 122, or a combination thereof. The data correction engine 115 can also perform data reliability check and correction, which will be further discussed later. The storage controller 116 can control and manage the flow of data between the data correction engine 115, the direct attached storage (DAS) devices 119 and the network attached storage devices 122 and amongst themselves. The data correction engine 115 and the storage controller 116 can be implemented in hardware circuitry, a processor running software, or a combination thereof.

For illustrative purposes, the data correction engine 115 and the storage controller 116 are shown as part of the data storage system 101, although the data correction engine 115 and the storage controller 116 can be implemented and partitioned differently. For example, the data correction engine 115 can be implemented as part of in the host computer 102, implemented partially in software and partially implemented in hardware, or a combination thereof. The storage controller 116 is a hardware interface that can transfer user data to or from storage devices including the local storage device 110, the non-volatile memory 112, the memory devices 117, the direct attached storage (DAS) devices 119, the network attached storage devices 122, or a combination thereof. The data correction engine 115 can be external to the data storage system 101. As examples, the data correction engine 115 can be part of the direct attached storage (DAS) devices 119 described above, the network attached storage devices 122, or a combination thereof. The functionalities of the data correction engine 115 can be distributed as part of the host computer 102, the direct attached storage (DAS) devices 119, the network attached storage devices 122, or a combination thereof. The data correction engine 115 can be a processor or other compute device and can have high speed assist logic associated with the error detection and correction.

The memory devices 117 can function as a memory cache to the data storage system 101, the computing system 100, or a combination thereof. The memory devices 117 can be a volatile memory or a nonvolatile memory. Examples of the volatile memory can be static random access memory (SRAM) or dynamic random access memory (DRAM).

The data correction engine 115 and the memory devices 117 enable the data storage system 101 to meet the performance requirements of data provided by the host computer 102 and the storage controller 116 can transfer that data between the local storage device 110, the non-volatile memory 112, the direct attach storage devices 119, or the network attached storage devices 122.

For illustrative purposes, the data storage system 101 is shown as part of the host computer 102, although the data storage system 101 can be implemented and partitioned differently. For example, the data storage system 101 can be implemented as a plug-in card in the host computer 102, as part of a chip or chipset in the host computer 102, as partially implement in software and partially implemented in hardware in the host computer 102, or a combination thereof. The data storage system 101 can be external to the host computer 102. As examples, the data storage system 101 can be part of the direct attached storage (DAS) devices 119 described above, the network attached storage devices 122, or a combination thereof. The data storage system 101 can be distributed as part of the host computer 102, the direct attached storage (DAS) devices 119, the network attached storage devices 122, or a combination thereof.

The data storage system 101 can implement the data correction processes used to support the direct attach storage devices 119 or the network attached storage devices 122. The data storage system 101 can implement error correction codes, such as RAID parity, a Bose, Chaudhuri, and Hocquenghem (BCH) codeword, a Reed-Solomon (RS) code, a low-density parity check code (LDPC), BSPP soft bit flipping, or a combination thereof for maintaining data integrity within a target bit error rate.

Figure 2:
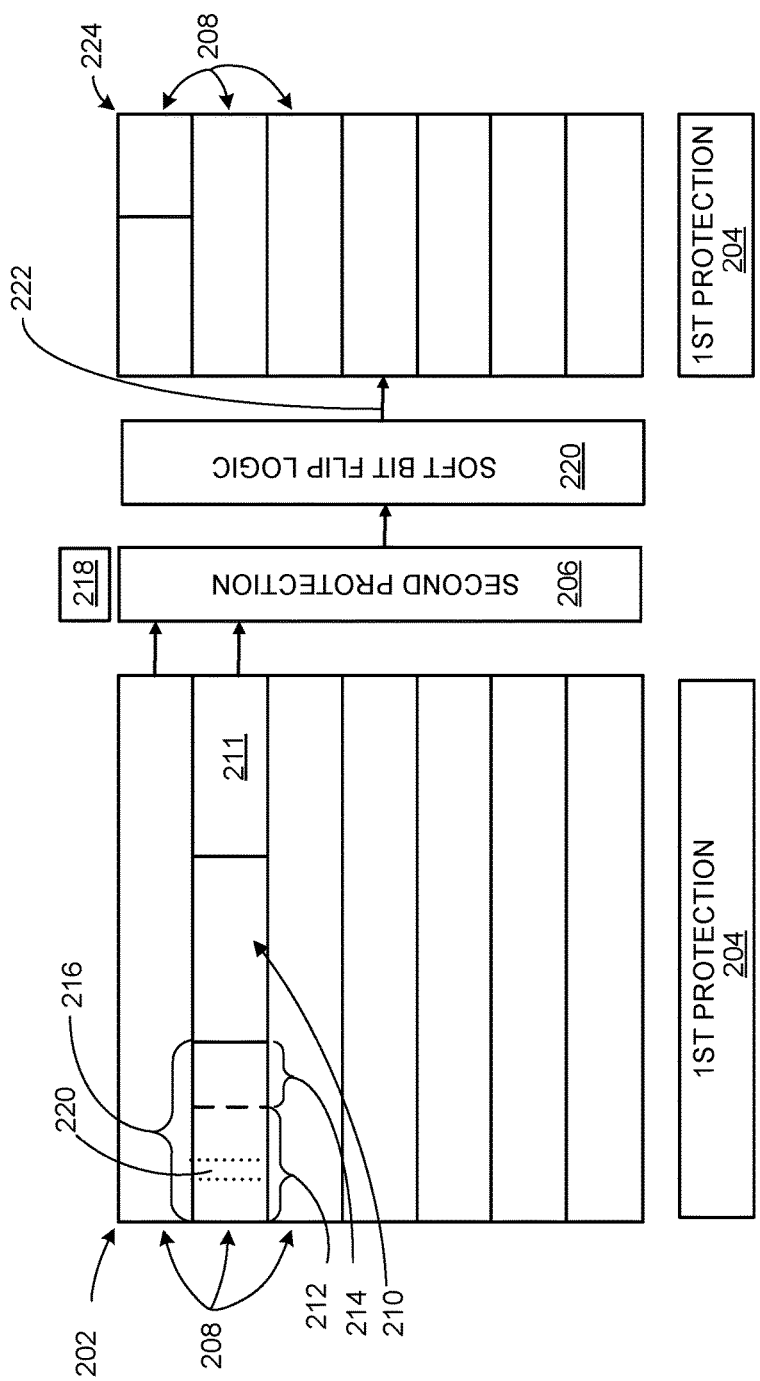
FIG. 2 depicts architectural views of the data protection enhancement mechanism in an embodiment.

Referring now to FIG. 2, therein is shown architectural views of the data protection mechanism in an embodiment. FIG. 2 depicts a representation of the data protection enhancement mechanism. The figure depicts a data block 202, a first protection 204, and a second protection 206. The second protection 206 can be a number of physical reads with programmed offsets that can enable further clarification of the detected error, or a logical process as in a RAID recovery, in which other non-error sectors can be combined in a logical fashion. The first protection 204 below the data block 202 while the second protection 206 is shown on the right-hand side of the data block 202 and is executed after the first protection 204 has executed on the data block 202.

The data block 202 includes data to be protected. The data block 202 can represent physical storage used for containing user data. The data block 202 can include storage elements from the host computer 102, the network attached storage devices 122, the DAS devices 119, or a combination thereof. As a more specific example, the data block 202 can represent physical storage including the memory devices 117, the local storage device 110, the non-volatile memory 112, the direct attach storage devices 119 or a combination thereof.

The data block 202 can include and be organized into data pages 208. Each of the data pages 208 can include data sectors 210.

As an example, the data protection mechanism for the data block 202 can be implemented as a 2D RAID parity with the first protection 204, the second protection 206, or a combination thereof. In this example, the data block 202 can be a RAID block. The data page 208 can represent data organized in pages. Each of the data pages 208 can include the data sectors 210. Each of the data sectors 210 can include sector data 212 and the sector redundancy 214, which can be an error correction sector. The sector data 212 and a sector redundancy 214 can make up a codeword 216. The sector redundancy 214 provides capabilities for the error detection, error correction, or a combination thereof.

The first protection 204 can be also be considered as part of the data block 202 and as one of the data page 208. The first protection 204, in this example, can be considered one sector for RAID parity page for other instances of the data page 208 in the data block 202. The second protection 206 can be a protection for each of the data sectors 210 in each of the data page 208 and can represent a rereading of error data sectors 211 that have detected errors. The second protection 206 can include regeneration of the error data sectors 211 through a logical process, such as XOR in RAID parity correction.

In an embodiment, the first protection 204 as the RAID parity page could be the logical combination of all the data pages 208 in the data block 202 as the RAID block. However, this would mean there is no protection with the sector redundancy 214, such as an ECC, for this page.

An embodiment of the present invention provides iterative raid assisted decoding. For this embodiment we assume the first protection 204 as the RAID parity page is as described for the third example above. In this case all parity sectors as a portion of the data sectors 210 are covered by RAID parity and the RAID parity page behaves like the data page 208. In this embodiment, the computing system 100 can decode the entire data block 202 as a RAID block. The computing system 100 can first attempt to correct each of the data sectors 210 using the sector redundancy 214 as the sector ECC.

Further the first protection 204 can utilize soft information 218 associated with the data page 208. The soft information 218 provides some measure of confidence from a channel. Examples of the soft information 218 can include Flash Log-Likelihood-Ratio (LLR) and can be utilized by the first protection 204.

If it is uncorrectable, the computing system 100 can apply RAID assisted decoding. As a more specific example, the codeword 216 can be a Bose, Chaudhuri, and Hocquenghem (BCH) codeword and the data protection mechanism as a RAID parity as noted above.

For illustrative purposes, the codeword 216 is described as a BCH codeword, although it is understood the codeword 216 can be other types using different error detection and correction codes. For example, other block codes can be utilized to form the codeword 216. As more specific examples, the codeword 216 can be formed with Reed-Solomon code or Low Density Parity Check (LDPC) code. Upon reading the data block 202, the first protection 204 can detect an error in the data sectors 210. The error data sectors 211 having the error can be operated on by the second protection 206 for extraction of the soft information 218.

Returning the example where the codeword 216 is a BCH codeword, the first protection 204 and the second protection 206 can be a series of re-reads, of the corrupted instance of the codeword 216, with specific offsets from a nominal read. By way of an example, a magnetic disk can be read with a dimensional offset from the track center or a solid state disk drive can be read with an offset of the nominal threshold voltage. Each of these can represent the second protection 206 and provide the soft information 218 about the corrupted instance of the codeword 216.

By way of an example, the second protection 206 can be that used by a RAID 4/5 configured storage system, where the parity is the XOR of N of the data bits. The parity sector can be denoted by P, and by:

$$P = \Sigma_{i=0}^{N-1} S_i, \quad \text{(Equation 1)}$$

Where, $S_i$, $0 \le i \le N-1$, represents the data sectors 210 within a RAID stripe. Hence, P is the addition of a binary field (i.e., bit-wise XOR). The second protection 206 submit the suspected data to an ECC decoder can be any type of ECC decoder, e.g., BCH decoder, RS decoder, LDPC decoder, etc. If the ECC decoding succeeds, the output will be free of error and the data sectors 210 can be used by the host CPU 104 of FIG. 1. If on the other hand, the ECC decoder does detect an error, the error data sector 211 found to be in error can be subjected to a logical process by:

$$X_1 = \Sigma_{i \ne} S'_1 + P' \quad \text{(Equation 2)}$$

Where $X_1$ is the result of performing an XOR of all of the data sectors 210, with the exception of the data sector 210 containing the error, with the parity sector P', which includes the error data sector 211 having the error. If only one of the data sectors 210 has an error, the resulting $X_1$ is the correction of the error data sector 211 that was identified as having an error. If more that one of the data sectors 210 is detected as having an error, they are passed to a soft bit flipping logic 220 to manipulate the sector data 212.

The soft bit flipping logic 220, is a one-dimension single parity based error correction algorithm that can utilize the soft information 218 to identify suspect data bits in the data sectors 210. The soft bit flipping logic 220 can utilize the soft information 218 to determine which of the sector data 212 has high confidence, and which has low confidence. It is understood that the soft bit flipping logic 220 can be implemented as a hardware algorithm, a software algorithm, or a combination thereof.

The soft bit flipping logic 220 maintains all of the sector data that has high confidence based on the soft information 218. Any of the sector data 212 that has low confidence can be replaced by the corresponding bits from the $X_1$ of equation 2. Hence the output of the soft bit flipping logic 220 can be described by:

$$S''_t(i) = \begin{cases} S'_t(i), & \text{if i-th bit is high confidence} \\ X_1(i), & \text{if i-th bit is low confidence} \end{cases} \quad \text{(Equation 3)}$$

Where $S''_t$ is a transformed data sector 222, of the soft bit flipping logic 220, that is presented to the first protection 204 for a final attempt to correct the error data sector 211.

The first protection 204 can process the transformed data sector 222 in order to generate a corrected data sector 224. It is understood that in severe cases, the first protection 204 may continue to detect an error in the error data sector 211, in which case a data error can be reported to the host CPU 104. In the majority of the cases, the addition of the soft bit flipping logic 220 can extend the range of correction capabilities of the first protection 204 in order to present the corrected data sector 224 to the host CPU 104.

It has been discovered that the implementation of the soft bit flipping logic 220 can improve the ability of the first protection 204 to effectively correct the data sectors 210 that are detected as originally having an error. The utilization of the soft information 218 to identify the sector data 212 having low confidence can minimize the range of correction required to repair the error data sectors 211.

Figure 3:
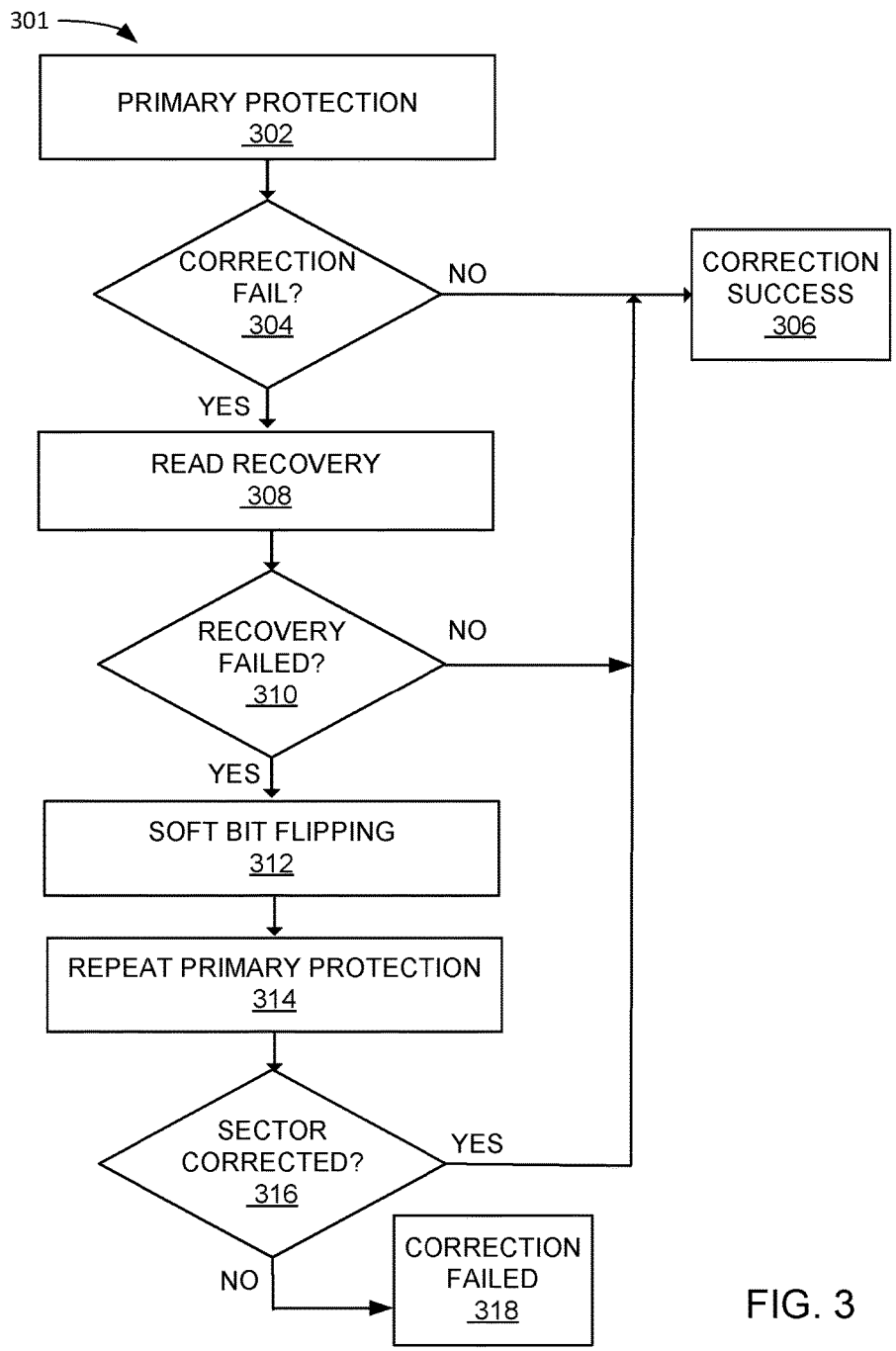
FIG. 3 is a flow chart of the operations of the data protection enhancement mechanism in an embodiment.

Referring now to FIG. 3, therein is shown a flow chart of operations 301 of the data protection enhancement mechanism 100 in an embodiment. The flow chart of the operations 301 shows a primary protection block 302, in which the data block 202 containing the data sector 210 having an error can be processed by the first protection 204 of FIG. 2. It is understood that the data block 202 can include a mixture of the data sectors 210 having an error and those of the data sectors 210 without a data error. The primary protection block 302 can pass any of the data sectors 210 without the data error to the host CPU 104 of FIG. 1 without performing any correction. Any of the data sectors 210 that are detected to have the data error are processed by the first protection 204 then passed to a correction fail check block 304.

The correction fail check block 304 can determine whether the first protection 204 was successful in correcting the data sectors 210. Any of the data sectors 210 that were successfully corrected can be passed to a correction success block 306 for transmission to the host CPU 104. The data sectors 210 that failed to be corrected by the first protection 204 can be passed to the read recovery block 308 if the second protection 206 successfully recovers the data sectors 210.

The read recovery block 308 can perform the second protection 206 on the data sectors 210 that remain in error. The second protection 206 can perform re-reads of the data with offsets from nominal or perform a logical process, such as XOR or applying polynomials, in order to assist in the recovery of the data and to generate the soft information 218 of FIG. 2. In some cases, the second protection 206 can correctly capture the data sectors 210 from the media due to the offsets used during the read recovery block 308. The flow then proceeds to a recovery failed check block 310 to determine the state of the data sectors 210. If the data sectors were corrected by the second protection 206, the data sectors 210 are passed to the correction success block 306. If any of the data sectors 210 was not corrected by the second protection 206, they are passed to a soft bit flipping block 312 for further processing.

The soft bit flipping block 312 can utilize the soft bit flipping logic 220 and the soft information 218 generated by the second protection 206 in order to generate the transformed data sector 222. The transformed data sectors 222 can have the sector data 212 that is in error transformed to a correctable state by the soft bit flipping logic 220. The transformed data sectors 222 are then passed to a repeat primary protection block 314.

The repeat primary protection block 314 can process the transformed data sectors 222 to the first protection 204 for a final attempt at correcting the data sectors 210. The transformed data sectors 222 can have the individual bits that were shown to have low confidence replaced by the bits indicated by the parity structure $X_1$ while the bits with high confidence remain unchanged from what was originally read from the media. The result can shorten the span of the data error and increase the probability that the first protection 204 can correct the transformed data sectors 222. The flow then proceeds to a sector corrected check block 316.

The sector corrected check block 316 can verify whether the first protection 204 was able to generate the corrected data sector 224. If the corrected data sector 224 was generated, the flow passes the corrected data sector 224 to the correction success block 306 for transmission to the host CPU 104. If the first protection 204 was unable to generate the corrected data sector 224, the flow proceeds to a correction failed block 318, in which the output of the first protection 204 is discarded and a data error can be reported to the host CPU 104.

It has been discovered that the second protection 206 in combination with the soft bit flipping logic 220 can enhance the ability of the first protection 204 to correct errors in the data block 202 beyond traditional error correction rates. The soft bit flipping logic 220 can be applied when multiple of the data sectors 210 contain errors that are not initially correctable by the first protection 204 in combination with only the second protection 206. By adding the soft bit flipping logic 220, the size of the error regions in the data sectors 210 can be reduced to a level that can be corrected by the first protection 204.

Figure 4:
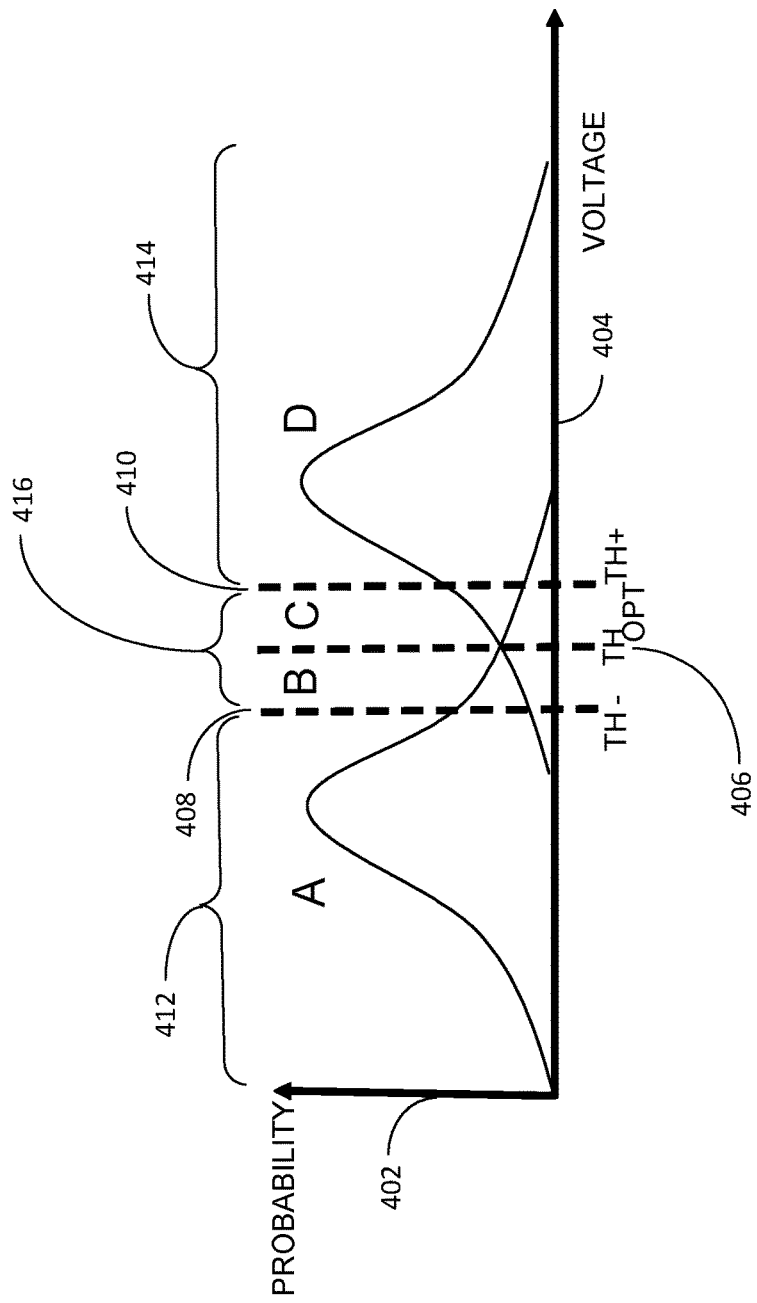
FIG. 4 is a graph of a probability of data bit voltage across a voltage range.

Referring now to FIG. 4, therein is shown a graph of a probability of data bit voltage across a voltage range. The graph of the probability 402 of the data bit voltage 404 shows the probability of cell voltage distributions of a FLASH memory cell (not shown) as an example of the mechanism for determining the confidence level of an individual data bit. It is understood that a similar mechanism can be utilized for successive readings of a magnetic bit with a physical offset from the track center.

The initial read of the data bit can be performed at an optimum threshold voltage ($TH_{OPT}$) 406. If an error is detected in the codeword 216 of FIG. 2, the second protection 206 of FIG. 2 can cause the storage controller 116 to re-read the error data sectors 211 of FIG. 2 using offsets, such as a lower threshold (TH−) 408 followed by reading with a higher threshold (TH+) 410.

If the data bit being analyzed provides the same level indication at the threshold $TH_{OPT}$ 406 and the threshold TH− 408, the data bit is considered to be a logic 1 with high confidence indicated by confident 1 412. If the data bit being analyzed provides the same level indication at the threshold $TH_{OPT}$ 406 and the threshold TH+ 410, the data bit is considered to be a logic 0 with high confidence indicated by confident 0 414. If however the data bit being analyzed provides the same level indication at the threshold $TH_{OPT}$ 406, the threshold TH− 408, and the threshold TH+ 410, the data bit is considered to be of low confidence whether it is detected as a logic 0 or a logic 1. This is indicated by a low confidence bit 416, which can be either a 0 or a 1.

By way of an example, let $R^+$ and $R^-$ be the data bit values with read threshold set to the threshold Th+ 410 and the threshold Th− 408, respectively. For readout of i-th data bit with the threshold Th+ 410, if a cell voltage falls into area "A", "B", or "C", which has lower voltage than the threshold Th+ 410, then its corresponding bit value is the logic 1, i.e., $R^+(i)=1$. If readout of i-th data bit falls into area "D" which has higher voltage than the threshold Th+ 410, then $R^+(i)=0$. Similarly, for the i-th readout with read threshold Th− 408, if a cell voltage falls into area "A" which has lower voltage than the threshold Th− 408, then its corresponding bit value 1, i.e., $R^-(i)=1$. If the i-th readout with the threshold Th− 408 falls into area "B", "C", or "D" which has higher voltage than the threshold Th− 408, then, i.e., $R^-(i)=0$.

It is understood that the analysis of magnetic media can be performed in a similar fashion by applying dimensional offsets from track center in order to emulate the threshold TH− 408 and the threshold TH+ 410. The data that is read on each of the re-read passes can be compared to determine the confidence level of the individual data bits.

It has been discovered that the confidence level of the individual data bits, of the data sectors 210 that were detected to be in error, can be determined by comparing the resultant data bits at the nominal threshold $TH_{OPT}$ 406 and at the offsets of the threshold TH− 408 and the threshold TH+ 410. Once the confidence level has been established as the soft information 218 of FIG. 2, the soft bit flipping logic 220 can be applied to the data sectors 210 that were originally read. The transformed sector 222 can be produced by altering the low confidence bit 416 based on the soft bit flipping logic 220 applied to the error data sectors 211 that were originally read.

Figure 5:
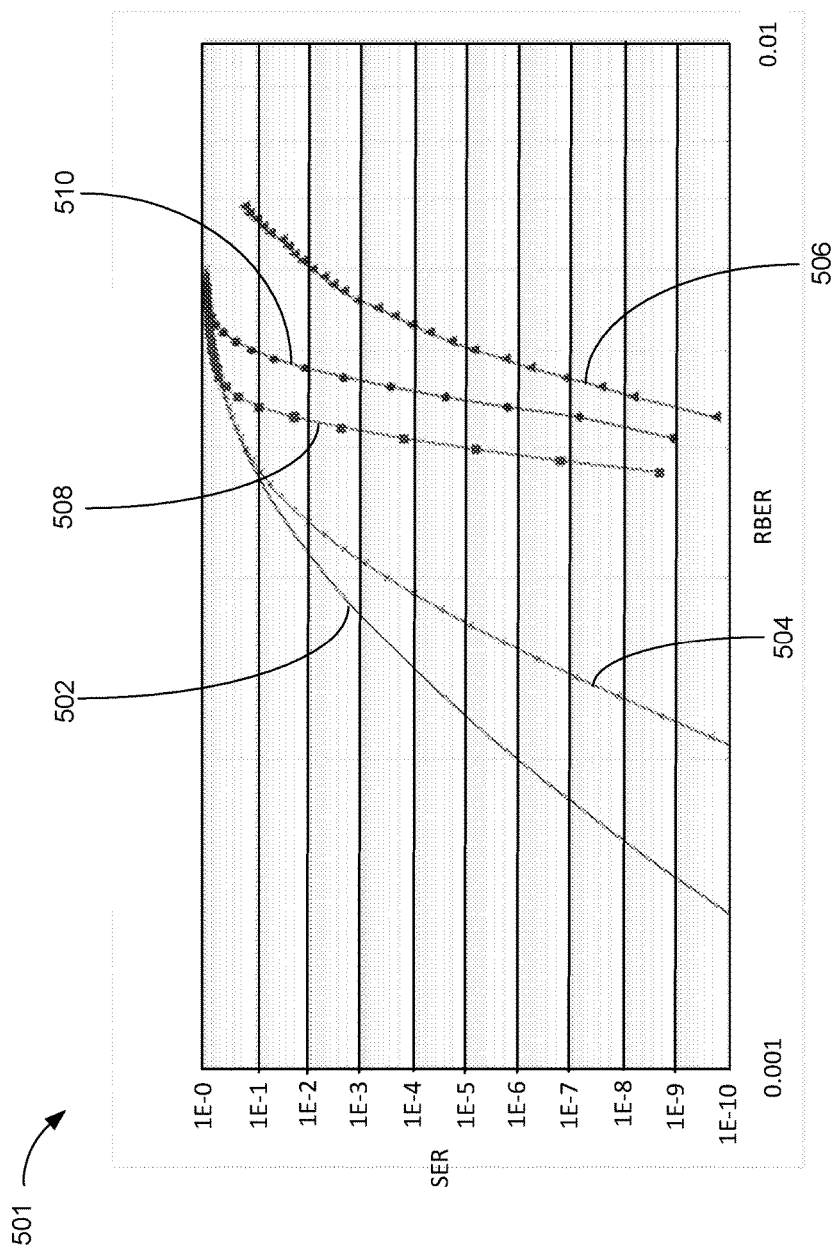
FIG. 5 is a graph depicting an example improvement of the raw bit error rate in an embodiment of the present invention.

Referring now to FIG. 5, therein is shown a graph depicting an example improvement of the raw bit error rate in an embodiment of the present invention. The graph depicts the sector error rate along the y-axis and the raw bit error rate along the x-axis. There are five plots depicted on the graph as an example of possible improvements in the ability to correct data errors in the data block 202 of FIG. 2. A BCH-40 502 depicts the sector failure rate with the first protection 204 of FIG. 2, such as the BCH-40 error correction coding scheme. A RAID parity 504 can enhance the error correction ability of the BCH-40 502 by layering a logical (XOR) with a parity sector embedded within the data block 202. The improvement in the error correction capability allows a greater number of error bits to be recovered, indicated by the curve transposed to the right of the curve for the BCH-40 502.

A BSPP soft 506 can be the process described as shown in FIG. 3, which utilizes the first protection 204, the second protection 206 of FIG. 2, and the soft bit flipping logic 220 of FIG. 2. The BSPP soft 506 can be implemented by:

$$X_{BSPP}=R^+\oplus((R^+\oplus X_1)\&X_2)=R^-\oplus((R^-\oplus X_1)\&X_2) \quad \text{(Equation 4)}$$

Where $X_{BSPP}$ is applied to each individual bit of the error data sectors 211 of FIG. 2 that are being corrected. The $R^+$ is each corresponding bit of the data sectors 210 of FIG. 2 read with the threshold Th+ 410 of FIG. 4. The $X_1$ is defined by Equation 2 and is the result of the original RAID parity process that failed to correct the error in the error data sectors 211. The $X_2$ can be the "exclusive or" of the bits read with the threshold Th+ 410 and the bits read with the threshold TH− 408 of FIG. 4 during the second protection 206.

For illustrative purposes, the computing system 100 is described operating on the data block 202 of FIG. 2, the first protection 204 of FIG. 2, the second protection 206 of FIG. 2, and the soft bit flipping logic 220 of FIG. 2, independent of location. It is understood that the data storage system 101 of FIG. 1, the data correction engine 115 of FIG. 1, the DAS devices 119 of FIG. 1, the network attached storage devices 122 of FIG. 1 can provide the data block 202, the first protection 204, the second protection 206, the soft bit flipping logic 220, or a combination thereof. The data block 202 can also represent the non-volatile memory 112, the memory devices 117, the local storage device 110, the direct attach storage devices 119, or a combination thereof.

The functions described in this application can be implemented as instructions stored on a non-transitory computer readable medium to be executed by the host central processing unit 104 of FIG. 1, the data storage system 101, the data correction engine 115, or a combination thereof. The non-transitory computer medium can include the host memory of FIG. 1, the DAS devices 119 of FIG. 1, the network attached storage devices 122, the non-volatile memory 112, the memory devices 117, the local storage device 110, the direct attach storage devices 119, or a combination thereof. The non-transitory computer readable medium can include compact disk (CD), digital video disk (DVD), or universal serial bus (USB) flash memory devices. The non-transitory computer readable medium can be integrated as a part of the computing system 100 or installed as a removable portion of the computing system 100.

Define $X_2 \triangleq R^+ \oplus R^-$, where the addition is in binary field (i.e., bit-wise XOR). Hence, it can be seen that $X_2(i)=1$ if i-th bit's corresponding cell voltage falls within the voltage range between the threshold Th+ 410 and the threshold TH− 408, i.e., in area "A" or "B" of FIG. 4; and $X_2(i)=0$ if i-th bit's corresponding cell voltage falls outside the voltage range between the threshold Th+ 410 and the threshold TH− 408, i.e., in area "C" or One way to implement BSPP soft is the following procedure:
  Read with the threshold Th+ 410 get readout $R^+$;
  Read with the threshold TH− 408 get readout $R^-$;
  Compute $X_2=R^+\oplus R^-$;
  Compute $X_{BSPP}=R^+\oplus((R^+\oplus X_1)\&X_2)=R^-\oplus((R^-\oplus X_1)\&X_2)$,
where $X_1$ is the result computed in previous second protection 206 (which failed to provide error free data).

The result $X_{BSPP}$ is then sent to the ECC decoder for applying the first protection 204.

The operator "$\oplus$" is in the binary field (i.e., bit-wise XOR), and the "&" is bit-wise AND operation. It is easy to prove that:

$$R^+\oplus((R^+\oplus X_1)\&X_2)=R^-\oplus((R^-\oplus X_1)\&X_2) \quad \text{(Equation 5)}$$

A BSPP original 508 and a BSPP4 510 can provide additional error correction capability over the BCH-40 502 and the RAID parity 402, but cannot match the error correction capabilities of the BSPP soft 506. It has been discovered that the BSPP soft 506 can correct multiple of the error data sectors 211 in a RAID Stripe by identifying the confidence level of the data bits based on the second protection 206 and applying the soft bit flipping logic 220. The soft bit flipping logic 220 can pass the bits with high confidence level and replace the bits with low confidence level.

Figure 6:
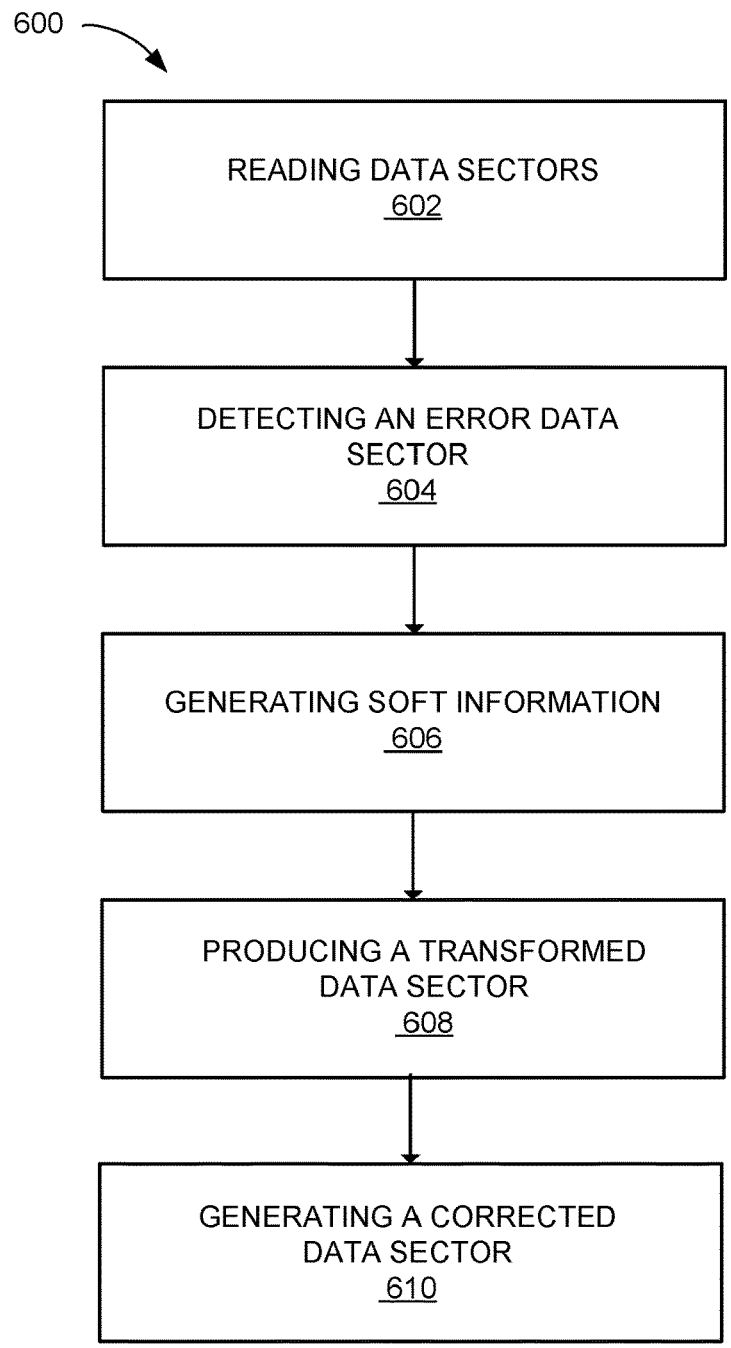
FIG. 6 is a flow chart of a method of operation of a computing system in an embodiment of the present invention.

Referring now to FIG. 6, therein is shown a flow chart of a method 600 of operation of a computing system 100 in an embodiment of the present invention. The method 600 includes: reading data sectors in a block 602; detecting an error data sector among the data sectors in a block 604; generating soft information from the error data sector in a block 606; producing a transformed data sector from the error data sector based on the soft information for altering a low confidence bit in a block 608; and generating a corrected data sector from the transformed data sector in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    storage devices configured to read data sectors; and
    a data correction engine, coupled to the storage devices, configured to:
        detect an error data sector among the data sectors by a first protection,
        generate soft information from the error data sector by a second protection,
        apply a soft bit flipping logic to the error data sector to produce a transformed data sector includes applying a one-dimension single parity based error correction algorithm utilizing the soft information provided by the second protection,
        generate a corrected data sector from the transformed data sector by the first protection applied to the transformed data sector, and
        transmit the corrected data sector through a host interface bus to a host central processing unit (CPU) for processing user data from the data sectors.

2. The system as claimed in claim 1 wherein the data correction engine is further configured to execute the second protection includes re-read the error data sector with offsets.

3. The system as claimed in claim 1 wherein the data correction engine is configured to apply the first protection to the data sectors to detect the error data sector.

4. The system as claimed in claim 1 wherein the data correction engine is further configured to determine a confidence level by comparing the error data sector read with a threshold Th+, a threshold Th−, or a combination thereof.

5. The system as claimed in claim 1 wherein the data correction engine is configured to determine a low confidence bit by detecting the same bit value with a threshold Th+ and a threshold Th−.

6. The system as claimed in claim 1 wherein the data correction engine is configured to verify a local storage device, the non-volatile memory, direct attached storage (DAS) devices, network attached storage devices, or a combination thereof.

7. The system as claimed in claim 1 wherein the data correction engine is configured to generate the soft information includes soft bit flipping applied to the error data sector.

8. The system as claimed in claim 1 wherein the data correction engine is configured to generate the corrected data sector includes the first protection applied to the transformed data sector.

9. The system as claimed in claim 1 wherein the data correction engine is configured to generate the corrected data sector from the transformed data sector includes the first protection applied to the transformed data sector.

10. The system as claimed in claim 1 wherein the data correction engine is configured to produce a transformed data sector includes soft bit flipping applied to the error data sector.

11. A method of operation of a computing system comprising:
    reading data sectors;
    detecting an error data sector among the data sectors by a first protection;
    generating soft information from the error data sector by a second protection;
    producing a transformed data sector from the error data sector based on the soft information for altering a low confidence bit including applying a one-dimension single parity based error correction algorithm utilizing the soft information provided by the second protection;
    generating a corrected data sector from the transformed data sector by applying the first protection to the transformed data sector; and
    transmitting the corrected data sector through a host interface bus to a host central processing unit (CPU) for processing user data from the data sectors.

12. The method as claimed in claim 11 further comprising applying offsets to re-read error data sectors.

13. The method as claimed in claim 11 wherein detecting the error data sector includes applying the first protection to the data sectors.

14. The method as claimed in claim 11 wherein generating the soft information includes determining a confidence level by comparing the error data sector read with a threshold Th+ and the error data sector read with a threshold Th−.

15. The method as claimed in claim 11 wherein generating soft information includes determining the low confidence bit by detecting the same bit value with a threshold Th+ and a threshold Th−.

16. The method as claimed in claim 11 wherein detecting an error data sector includes verifying a local storage device, the non-volatile memory, direct attached storage (DAS) devices, network attached storage devices, or a combination thereof.

17. The method as claimed in claim 11 wherein generating the soft information includes applying a soft bit flipping logic to the error data sector.

18. The method as claimed in claim 11 wherein generating the corrected data sector includes applying the first protection to the transformed data sector.

19. The method as claimed in claim 11 wherein generating the corrected data sector from the transformed data sector includes applying the first protection to the transformed data sector.

20. The method as claimed in claim 11 wherein producing the transformed data sector includes applying a BSPP soft to the error data sector.

21. A non-transitory computer readable medium including instructions for execution, the medium comprising:
    reading data sectors;
    detecting an error data sector among the data sectors by a first protection;
    generating soft information from the error data sector by a second protection;
    producing a transformed data sector from the error data sector based on the soft information for altering a low confidence bit including applying a one-dimension single parity based error correction algorithm utilizing the soft information provided by the second protection;

generating a corrected data sector from the transformed data sector by applying the first protection to the transformed data sector; and transmitting the corrected data sector through a host interface bus to a host central processing unit (CPU) for processing user data from the data sectors.

22. The medium as claimed in claim 21 further comprising applying offsets to re-read error data sectors.

23. The medium as claimed in claim 21 wherein detecting an error data sector includes applying the first protection to the data sectors.

24. The medium as claimed in claim 21 wherein generating the soft information includes determining a confidence level by comparing the error data sector read with a threshold Th+ and the error data sector read with a threshold Th−.

25. The medium as claimed in claim 21 wherein generating the soft information includes determining the low confidence bit by detecting the same bit value with a threshold Th+ and a threshold Th−.

26. The medium as claimed in claim 21 wherein detecting an error data sector includes verifying a local storage device, the non-volatile memory, direct attached storage (DAS) devices, network attached storage devices, or a combination thereof.

27. The medium as claimed in claim 21 wherein generating the soft information includes applying a soft bit flipping logic to the error data sector.

28. The medium as claimed in claim 21 wherein generating the corrected data sector includes applying the first protection to the transformed data sector.

29. The medium as claimed in claim 21 wherein generating the corrected data sector from the transformed data sector includes applying the first protection to the transformed data sector.

30. The medium as claimed in claim 21 wherein producing the transformed data sector includes applying a BSPP soft to the error data sector.

* * * * *